United States Patent [19]

Kage

[11] Patent Number: 5,093,928
[45] Date of Patent: Mar. 3, 1992

[54] CHANNEL SELECTION SYSTEM FOR MOBILE RADIO COMMUNICATION EQUIPMENT

[75] Inventor: Kouzou Kage, Tokyo, Japan
[73] Assignee: NEC Corporation, Japan
[21] Appl. No.: 555,894
[22] Filed: Jul. 20, 1990

[30] Foreign Application Priority Data

Jul. 24, 1989 [JP] Japan ................... 1-188808

[51] Int. Cl.⁵ .................. H04B 15/00; H04Q 7/00
[52] U.S. Cl. ........................... 455/34; 455/54; 455/62; 455/63
[58] Field of Search ............. 455/9, 33, 34, 50, 54, 455/62, 63, 17 G, 185, 53, 56, 67; 379/59, 60, 63; 370/95.1

[56] References Cited

U.S. PATENT DOCUMENTS

| | | | |
|---|---|---|---|
| 4,345,334 | 8/1982 | Nordahl | 455/50 |
| 4,659,878 | 4/1987 | Dinkins | 370/71 |
| 4,792,984 | 12/1988 | Matsuo | 455/32 |
| 4,870,696 | 9/1989 | Yorita | 455/49 |
| 4,914,651 | 4/1990 | Lusignan | 370/69.1 |
| 4,965,849 | 10/1990 | Kunihiro | 455/34 |

FOREIGN PATENT DOCUMENTS 0170134  7/1989  Japan ..................... 455/34

Primary Examiner—Reinhard J. Eisenzopf
Assistant Examiner—Chi H. Pham
Attorney, Agent, or Firm—Laff, Whitesel, Conte & Saret

[57] ABSTRACT

A channel selection system for radio communication equipment which uses a control channel for interchanging control signals for connection and a plurality of data channels for interchanging data and emits an electromagnetic wave by using any one of the data channels after determining that it is idle by carrier sensing. The system rarely selects a data channel adjoining the control channel since the probability that such a data channel is registered as an idle channel is extremely low. The system, therefore, reduces the possibility of the equipment being unable to use the control channel due to the influence of power leaking from the data channel adjoining the control channel.

11 Claims, 3 Drawing Sheets

CHANNEL SELECTION SYSTEM FOR MOBILE RADIO COMMUNICATION EQUIPMENT

BACKGROUND OF THE INVENTION

The present invention relates to a channel selection system for mobile radio communication equipment of the type using a control channel for interchanging control signals for connection and a plurality of data channels for interchanging data and deciding whether or not to emit an electromagnetic wave after determining whether or not other equipment associated therewith are emitting electromanetic waves.

A conventional channel selection system for the above-described type of communication equipment selects and idle data channel with no regard to whether or not that channel adjoins the control channel with respect to frequency. It is, therefore, quite likely that a data channel adjoining the control channel is used for communication. The use of such a data channel would not matter at all if a transmit station were located remote enough from a desired receive station to sense no carrier on the adjoining control channel. However, as the transmit station approaches the receive station, the probability that the transmit station senses the carrier on the control channel increases due to power which leaks from the adjoining data channel. Then, the transmit station would be unable to emit an electromagnetic wave over the control channel and, therefore, to connect itself to the receive station.

SUMMARY OF THE INVENTION

It is therefore an object of the present invention to provide a channel selection system for mobile radio communication equipment which allows the equipment to emit an electromagnetic wave over a control channel by keeping it away from power leaking from a data channel adjoining the control channel.

It is another object of the present invention to provide a generally improved channel selection system for mobile radio communication equipment.

In a channel selection system for radio communication equipment which uses a control channel for interchanging control signals for connection and a plurality of data channels for interchanging data and emits an electromagnetic wave by using any one of the data channels after determining that the one data channel is idle by carrier sensing, in accordance with the present invention, even when the one data channel is idle, another data channel is selected if the one channel adjoins the control channel with respect to frequently.

A channel selecting method for radio communication equipment which uses a control channel for interchanging control signals for connection and a plurality of data channels for interchanging data and decides whether or not to emit an electromagnetic wave after determining whether or not any other radio communication equipment is emitting an electromagnetic wave of the present invention comprises the steps of registering the control channel and the data channels which are idle in a storage while the equipment is in a waiting condition, selecting one of the registered channels which is intended for transmission, determining whether or not the one channel is idle, starting on a transmission if the one channel is idle, determining, if the one channel is not idle, whether or not the one channel is the control channel, waiting, if the one channel is the control channel, until the one channel becomes idle, and selecting, if the one channel is not the control channel, another channel out of the channels having been registered in the storage.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
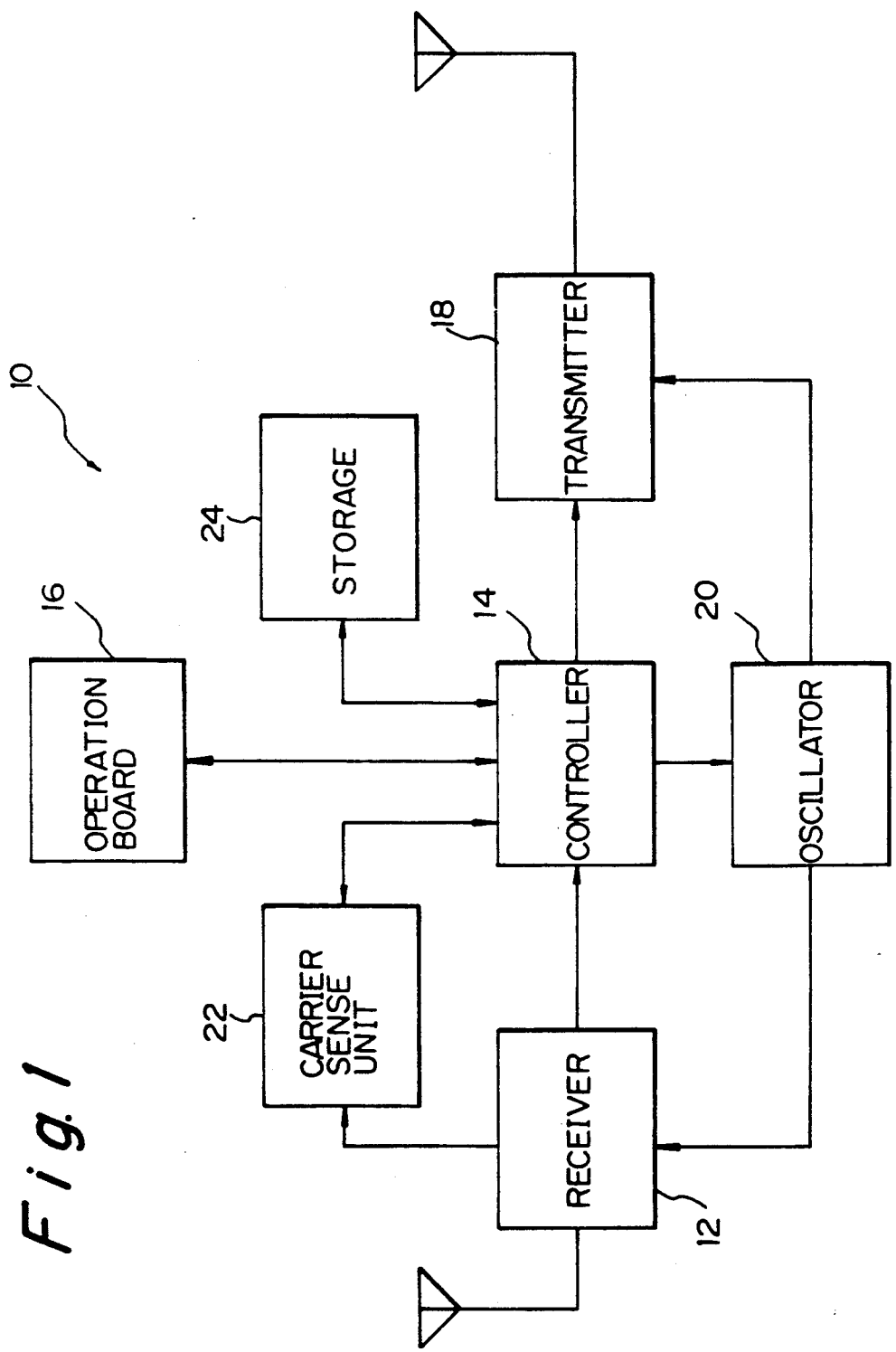
FIG. 1 is a block diagram showing a specific construction of radio communication equipment to which the present invention is applicable.

Referring to FIG. 1 of the drawings, radio communication equipment to which the present invention is applicable is shown and generally designated by the reference numeral 10. As shown, the equipment 10 has a receiver 12 for receiving signals, a controller 14 implemented with a microcomputer, an operation board 16, a transmitter 18 for transmitting signals, an oscillator 20 using a synthesizer, a carrier sensing unit 22, and a storage 24 implemented as a RAM.

A signal received by the receiver 12 is fed to the controller 14. Data entered on the operation board 16 is applied to the transmitter 18 by way of the controller 14. In response, the transmitter 18 transmits the input data. The frequencies which the transmitter 12 and receiver 18 can transmit and receive over the radio channels are determined by the reference frequency which is generated by the oscillator 20. The reference frequency is, in turn, determined by frequency data applied to the oscillator 20 from the controller 14.

The equipment 10 detects a frequency available for transmission by sensing a carrier. Specifically, the carrier sensing unit 22 measures, for example, the IF (Intermediate Frequency) level of a received signal and, when the measured IF level is higher than a predetermined level, determines that a received electric field exists. Then, the carrier sensing unit 22 informs the controller 14 of such an occurrence.

The controller 14 sequentially switches over the channel of the receiver 12 while in a waiting condition so as to sense a carrier on the individual channels. On detecting an idle channel usable for transmission, the controller 14 registers it in the storage 24.

Figure 2:
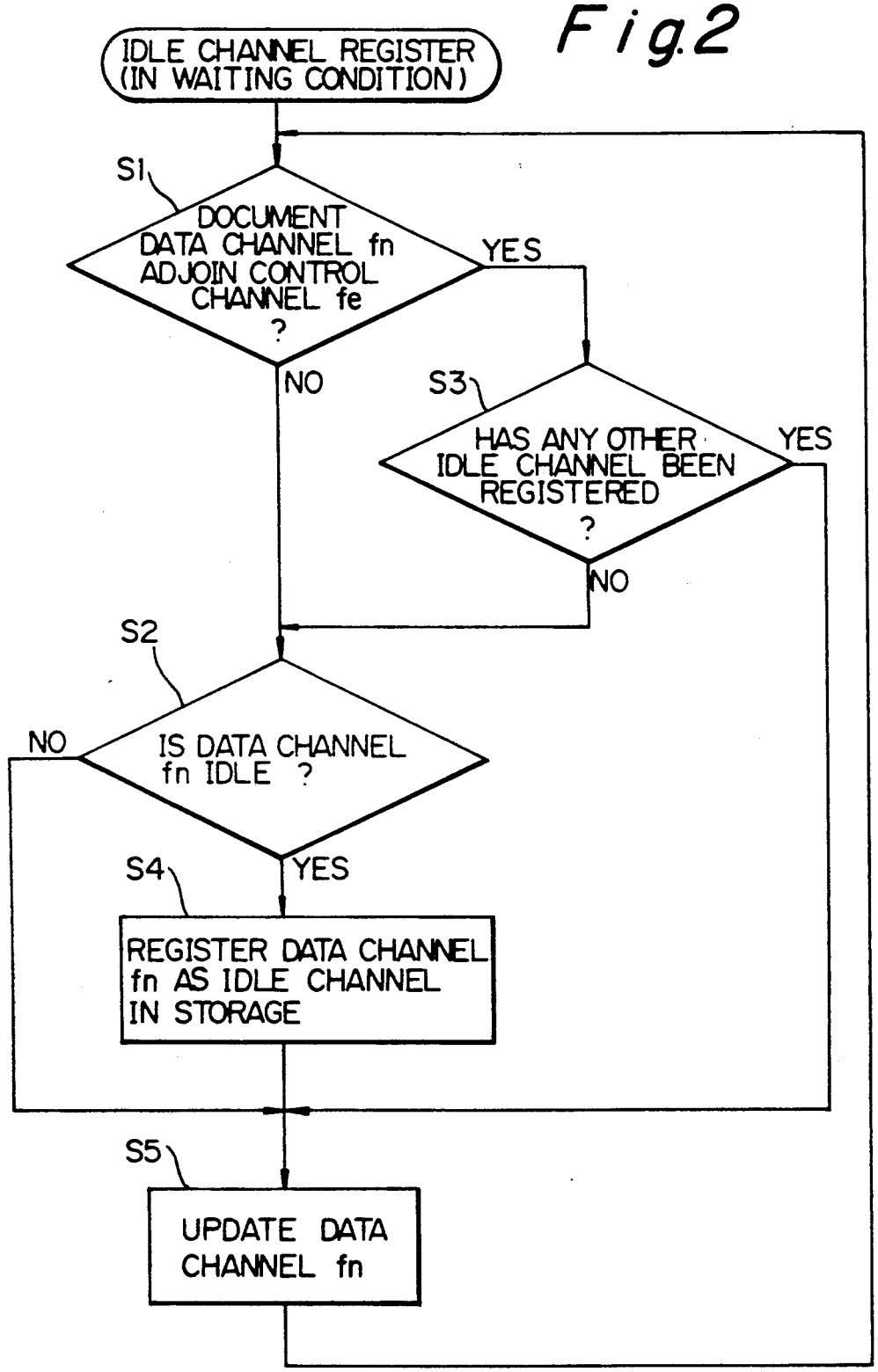
FIG. 2 is a flowchart showing a specific operation of a channel selection system embodying the present invention relating to the registration of idle channels in a storage.

A specific sequence of steps for registering idle channels is shown in FIG. 2. As shown, whether or not a certain data channel $f_n$ adjoins a control channel $f_c$ is determined (step S1). If the answer of the step S1 is NO, the carrier on the channel $f_n$ is sensed to see if the channel $f_n$ is idle (step S2). If the data channel $f_n$ adjoins the control channel $f_c$ as determined in the step S1, whether or not any data channel has been registered in the storage 24 as an idle channel is determined (step S3). If the answer of the step S3 is NO, the step S2 is executed. When the channel $f_n$ is idle as determined in the step S2, it is registered in the storage 24 (step S4). Subsequently, the channel $f_n$ is updated (step S5) to examine the next channel. If the answer of the step S2 is NO, the channel $f_n$ is also updated (step S5) to check the next channel $f_{n+1}$. If the answer of the step S3 is YES, i.e., if the channel $f_n$ adjoins the control channel $f_c$ and any channel has been registered as an idle channel, the channel $f_n$ is also updated (step S5).

In the above procedure, it is only when no idle channels are available that the data channel adjoining the control channel is registered in the storage 24. Stated another way, the probability that the data channel adjoining the control channel is registered in the storage 24 as an idle channel is low.

Figure 3:
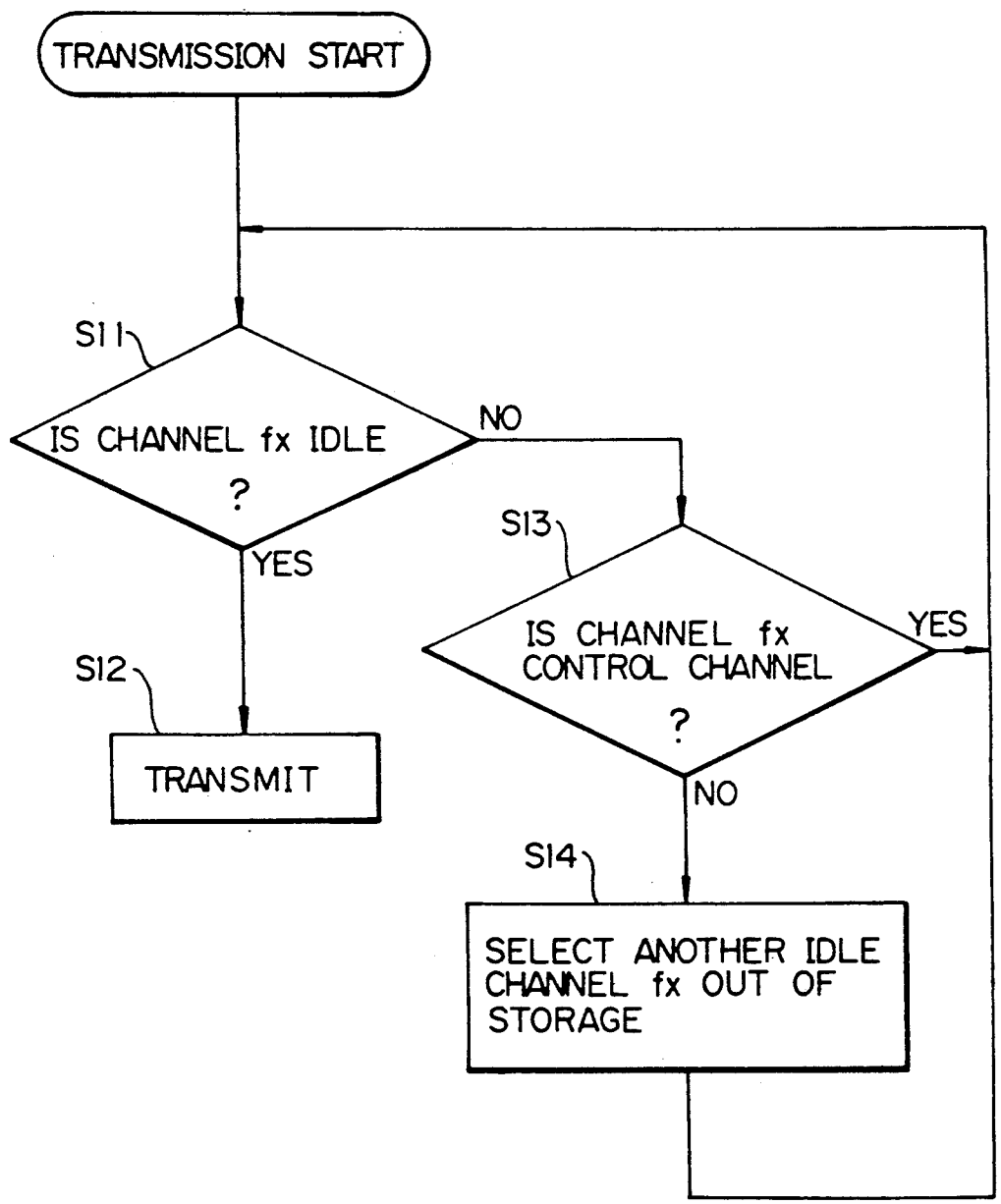
FIG. 3 is a flowchart showing a specific operation for starting on a transmission.

FIG. 3 is a flowchart representative of a specific procedure for the equipment 10 to start on a transmission. As shown, the controller 14 checks the storage 24 to see if, among the channels registered in the storage 24 as stated above, a channel $f_x$ intended for a transmission is idle by carrier sensing, whether it be the control channel or the data channel (step S11). If the answer of the step S11 is YES, the controller 14 starts on a transmitting operation (step S12). If the answer of the step S11 is NO, the controller 14 determines whether or not the channel $f_x$ is the control channel (step S13). If the answer of the step S13 is NO, the controller 14 selects another channel $f_x$ out of the storage 24 (step S14). If the answer of the step S13 is YES, the program returns to the step S11 to wait until it detects an idle channel.

In summary, it will be seen that the present invention provides a channel selection system which rarely selects a data channel adjoining a control channel since the probability that such a data channel is registered as an idle channel is extremely low. The system, therefore, reduces the possibility of mobile radio communication equipment being unable to use the control channel due to the influence of power leaking from the particular data channel.

Various modifications will become possible for those skilled in the art after receiving the teachings of the present disclosure without departing from the scope thereof.

What is claimed is:

1. In a system having a control channel for interchanging control signals for connection, a plurality of data channels and at least one radio communication means;

each of said radio communication means comprising:
   transmitter means for transmitting control signals or data over one of said control and data channels;
   receiver means for receiving control signals or data over one of said control and data channels;
   carrier sensing means for sensing an electromagnetic wave on one of said control and data channels to which said transmitter and said receiver are tuned;
   control means for determining whether or not first one of said data channels adjoins said control channel with respect to frequency; and
   storage means for storing said first data channel as an idle channel when said control means determines that said first data channel does not adjoin said control channel with respect to frequency and when said carrier sensing means senses no electromagnetic wave on said first data channel.

2. A channel selecting method for radio communication equipment which uses a control channel for interchanging control signals for connection and a plurality of data channels for interchanging data and decides whether or not to emit an electromagnetic wave after determining whether or not any other radio communication equipment is emitting an electromagnetic wave, said method comprising the steps of:

(a) registering the data channels which are idle in a storage while the equipment is in a waiting condition;
   (b) selecting one of the control channel and the registered channels which is intended for transmission;
   (c) determining whether or not said one channel is idle;
   (d) starting on a transmission if said one channel is idle;
   (e) determining, if said one channel is not idle, whether or not said one channel is the control channel;
   (f) waiting, if said one channel is the control channel, until said one channel becomes idle; and
   (g) selecting, if said one channel is not the control channel, another channel out of the channels having been registered in the storage.

3. A method as claimed in claim 2, wherein step (a) comprises the steps of:

(h) determining whether or not a certain channel adjoins the control channel;
   (i) determining, if said certain channel adjoins the control channel, whether or not any channel has been stored as an idle channel in the storage;
   (j) determining, if said certain channel does not adjoin the control channel as determined in step (h) or if no idle channel has been stored as determined in step (i), whether or not said certain channel is idle;
   (k) storing, if said channel is idle as determined in step (j), said certain channel as an idle channel in the storage;
   (l) updating said certain channel if said channel is not idle as determined in step (j), or if any channel has been stored as an idle channel as determined in step (i); and
   (m) returning to step (h) after executing step (l).

4. An apparatus comprising:
   storage means for storing idle channels among a plurality of communication channels to be used by said apparatus;
   first decision means for determining whether or not the frequency of a first channel adjoins the frequency of a control channel to be used by said apparatus, said first channel being included in said communication channels;
   second decision means for determining whether or not said first channel is idle when said first decision means determines that the frequency of said first channel does not adjoin the frequency of said control channel; and
   means for registering said first channel in said storage means as an idle channel when said second decision means determines that said first channel is idle.

5. An apparatus as claimed in claim 4, wherein said second decision means comprises carrier sensor means for sensing an electromagnetic wave on each of said communication channels.

6. An apparatus as claimed in claim 4, further comprising third decision means for determining whether or not an idle channel is registered in said storage means when said first decision means determines that the frequency of said first channel adjoins the frequency of said control channel;

said second decision means comprising means for determining whether or not said first channel is idle when said first decision means determines that the frequency of said first channel does not adjoin the frequency of said control channel or when said third decision means determines that no idle channel is registered in said storage means.

7. A method of selecting among a plurality of communication channels a channel for communication, comprising the following steps of:
   selecting a first idle channel among said communication channel;
   checking if said first idle channel adjoins a control channel with respect to frequency;
   selecting a second idle channel among said communication channels when said checking step decides that said first idle channel adjoins said control channel with respect to frequency; and
   transmitting data over said second idle channel.

8. A method for selecting a radio channel in a communications system having a control channel and a plurality of data channels, means for sensing whether a carrier is present on a channel, and storage means for recording whether a channel is idle, comprising the steps of:
   choosing a candidate channel among said data channels;
   determining whether said candidate channel is adjacent said control channel;
   determining whether any other channels are recorded as idle in said storage means;
   determining whether said candidate channel is idle by sensing whether a carrier is present on said candidate channel; and
   selecting said candidate channel only if said candidate channel is idle and either said candidate channel is not adjacent to said control channel or no other channels are recorded as idle in said storage means.

9. A method for identifying an idle radio channel in a communications system having a control channel and a plurality of data channels, means for sensing whether a carrier is present on a channel, and storage means for recording whether a channel is idle, comprising the steps of:
   choosing a candidate channel among said data channels;
   determining whether said channel is adjacent said control channel; and, if so,
   omitting to record as idle in said storage means said candidate channel unless no other channels are recorded as idle in said storage and no carrier is sensed on said candidate channel.

10. A channel selection system for a communications system comprising:
    a control channel;
    a plurality of data channels;
    means for storing indicia of channels available for selection;
    means for sensing whether a carrier is present on a candidate channel chosen among said data channels;
    first decision means for determining whether said candidate channel is adjacent said control channel;
    second decision means for determining whether any channels other than said candidate channel are recorded in said storage means as available for selection;
    third decision means responsive to said sensing means for determining whether said candidate channel is idle;
    means responsive said first, second, and third decision means for recording in said storage means a candidate channel adjacent said control channel as available for selection exclusively when said candidate channel is idle and no channels other than said candidate channel are recorded in said storage means as available for selection.

11. The channel selection system of claim 10 further comprising means responsive to said storage means for selecting a channel among those stored therein as available for selection.

* * * * *